United States Patent [19]

Gramling

[11] 4,197,559
[45] Apr. 8, 1980

[54] COLOR TELEVISION DISPLAY SYSTEM

[76] Inventor: William D. Gramling, 5144 Newport Ave., Chevy Chase, Md. 20016

[21] Appl. No.: 950,677

[22] Filed: Oct. 12, 1978

[51] Int. Cl.² .............................................. H04N 9/12
[52] U.S. Cl. ...................................... 358/58; 358/67; 358/69
[58] Field of Search ...................... 358/58, 60, 61, 62, 358/63, 67, 69

[56] References Cited
U.S. PATENT DOCUMENTS

| 2,921,118 | 1/1960 | Benjamin | 358/58 |
| 3,086,076 | 4/1963 | Harries | 358/69 |

Primary Examiner—Richard Murray

[57] ABSTRACT

Means for projecting a color television picture by rotating or otherwise moving a multi-colored filter in front of a monochrome projection tube and detecting the color of the projected light to electronically switch the appropriate color video input to the projection tube.

4 Claims, 4 Drawing Figures

R B G
Video Input

COLOR TELEVISION DISPLAY SYSTEM

BACKGROUND OF THE INVENTION

The present invention relates to the field of color television projection systems.

DESCRIPTION OF PRIOR ART

There is a great need for a low-cost large-screen television display system. However, it is very difficult to achieve the necessary brightness with a single tri-color tube. The normally accepted method is to project three tubes through red, blue and green filters, and appropriate optics. This method is expensive and requires somewhat precise optics to achieve registration. Another method is that of bombarding an oil film with a modulated electron beam to modulate light passing through the film. But this, too, is a very costly process and not practical for home use.

SUMMARY OF THE INVENTION

The primary object of the present invention is to provide a practical, low-cost single tube color projection system. A further object of the present invention is to provide a low-cost, direct-view color television viewing system.

BRIEF DESCRIPTION OF THE DRAWINGS

Referring to the illustrations.

DESCRIPTION OF THE PREFERRED EMBODIMENTS

Figure 1:
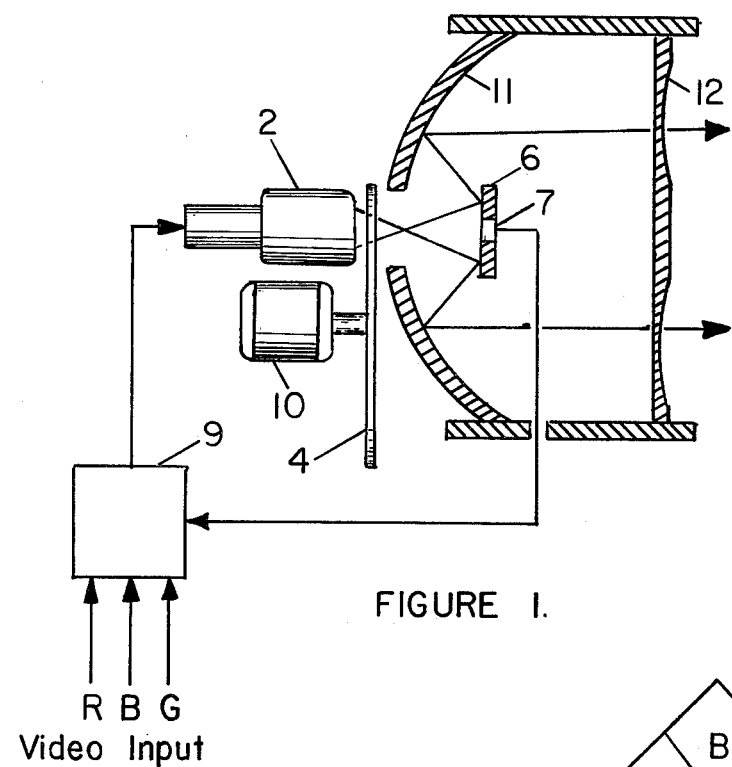
FIG. 1 shows the present invention utilizing Schmidt optics. The associated power supplies and video detecting and processing amplifiers are omitted for clarity.
Figure 2:
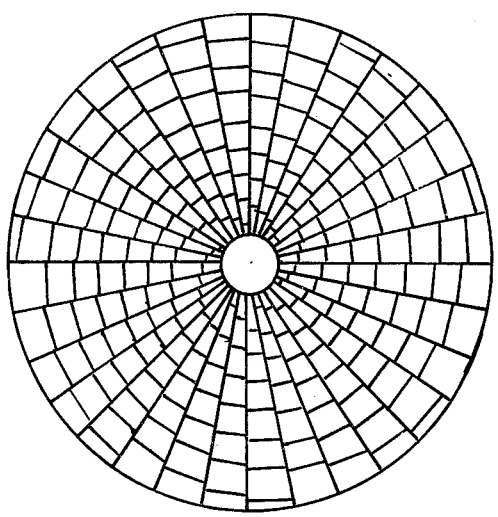
FIG. 2 shows the preferred embodiment of the revolved filter disc.
Figure 3:
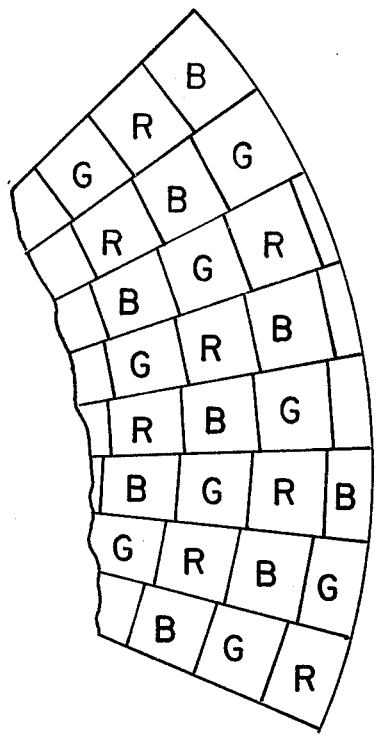
FIG. 3 is the detail of a portion of the revolved filter disc, showing the color configuration.

Referring to FIG. 1, the television projection tube 2 is in close proximity to the revolved filter disc 4 and faces the mirror 6. The filter disc 4 is revolved by the motor 10. Imbedded in the mirror 6, facing the projection tube 2, are three photo sensors 7, each detecting one of the primary colors, red, blue and green. The photo sensors 7 are represented in the drawing as a single block for clarity. The outputs of the photo sensors 7 are directed to the video selector switch 9. The detected red, blue and green video portions of the projected television signal are also fed to the video selector switch 9.

The operation of the present invention is as follows: The light is emitted from the television projection tube 2 and passes through the revolved filter disc 4 to the mirror 6. The light is then directed to the spherical mirror 11, through the correcting lens 12 and to the screen.

The filter disc 4 colors the emerging projector light red, blue or green, depending on which portion of the filter disc 4 the tube sees. This color is detected by one of the photo sensors 7. The sensor instructs the video selector switch 9 to choose the appropriate color video input to the projector tube 2, matching the video input to the color of the light. As the beam of light moves across the faceplate of the projection tube 2, different portions of the filter disc 4 will be used, changing the color of the light passing through and subsequently activating the sensors 7 and switching the video switch 9 to the corresponding video input to the projector tube 2.

Figure 4:
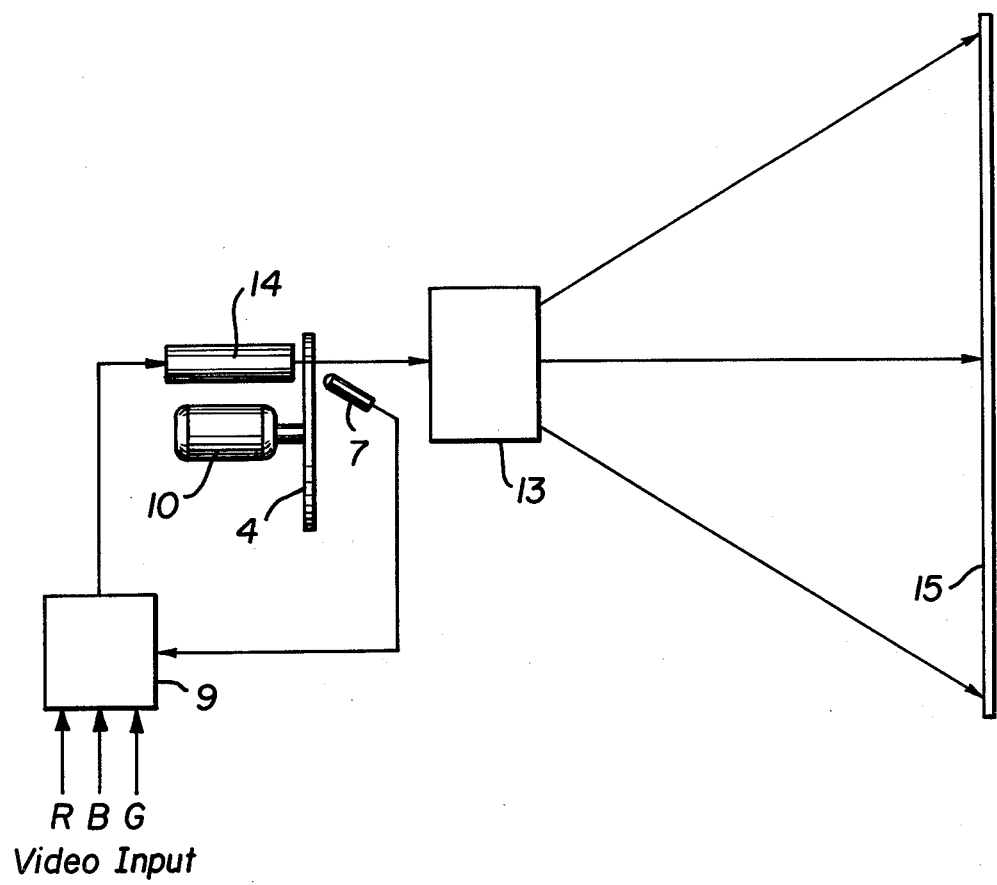
FIG. 4 represents the present invention comprising a focused video-modulated light source such as a laser or a collimated incandescent light, projected through an optical scanning device.

In FIG. 4, the filter disc 4, driven by the free-running motor 10, is placed in front of the collimated light source 14. The photo sensors are placed in a position to sample the color of light passing through the filter disc 4. The colored light then enters the mechanical scanner 13 which projects the light onto the screen 15 as a scanned television picture. As in FIG. 1, the photo sensors instruct the video switcher 9 to feed the correct video signal to the light source 14. Mechanical scanners are well known in the art and presently comprise rotated mirrors and prisms.

The first field of video projected will now be composed of a mosaic of different colors, all correct in their respective brightness components. On the next field, the filter disc 4, revolved by the motor 10, has changed the pattern of the disc in front of the projector tube faceplate. Each subsequent field projects a different pattern, with the three primary colors sequentially covering all areas of the projected picture.

Flutter in a television picture originates with rythmic light patterns. The present invention breaks up these rythmic patterns by using a completely random filter pattern and an unlocked drive motor to give a sequence of randomly colored pictures.

The human eye will combine these sequential pictures into one true color picture with no flutter or color break-up of moving televised objects.

The pattern of the filter disc should include blocks of color no longer or wider than 10-15 scan lines, and the respective areas of the three primary colors should be equal. This design will eliminate the two deficiencies of sequential systems—flutter and edge break-up of moving objects. The equal areas of red, blue and green will give a true representation of color.

A secondary consideration for filter design is to place an opaque strip between all color blocks to give a sharper switching command from the photo sensors 7 to the video selector switch 9. Another consideration would be to place transparent, uncolored areas in the filter disc to increase overall picture brightness. The clear areas in the filter, however, would tend to reduce color saturation.

Although preferred embodiment of the filter would be a disc, a drum or a vibrated resilient filter configuration, any other filter design would be within the spirit of the invention.

Since the color patterns are necessarily random, the filter disc motor 10 need not be synchronized. The video input to the projector tube 2 will be switched correctly regardless of the position of the filter disc 4 or the speed of the motor 10.

Thus, the randomness of the color switching will avoid the disadvantages of previous sequential systems, edge break-up, flutter, line-crawl and dot-crawl.

The photo sensors 7 and the video selector switch 9 must be very fast-acting, in the range of nanoseconds, and essentially transient-free. Sensors and switchers of this nature are presently available.

Although the preferred embodiment of the present invention is a projector configuration, a direct-view television cathode ray tube can also be used, provided the photo sensors are placed in a position where they can sample the color of the light emerging through the filter disc 4.

The present invention can be used for industrial applications where a very high brightness level is needed for large screens. A mechanically scanned system can be used such as the modulated beam bombarding of an oil film to modulate light passing through the oil film, where the photo sensors 7 and the video switcher 9 would supply the correct video to the beam, or, in the case of a laser light source, to modulate the light source itself.

What I claim is:

1. A color television viewing system comprising: A light source modulated by a color television signal, a multi-colored filter placed in motion by a free-running, random speed power source, said multi-colored filter in close frontal proximity to said light source, photo sensors sampling filter-colored light emerging from said light source for purpose of switching appropriate video signal into said modulated light source.

2. Means in accordance with claim 1 wherein said light-emitting display device is a cathode ray tube.

3. Means in accordance with claim 1 wherein said light-emitting display device is a mechanical scanner.

4. Means in accordance with claim 1 wherein said light is emerging from a television cathode ray tube.

* * * * *